(12) United States Patent
Davis

(10) Patent No.: US 10,207,713 B1
(45) Date of Patent: Feb. 19, 2019

(54) ELECTRONIC TRACTION CONTROL

(71) Applicant: Davis Intellectual Properties LLC, Asheville, NC (US)

(72) Inventor: Shannon R. Davis, Weaverville, NC (US)

(73) Assignee: Davis Intellectual Properties LLC, Asheville, NC (US)

( * ) Notice: Subject to any disclaimer, the term of this patent is extended or adjusted under 35 U.S.C. 154(b) by 242 days.

(21) Appl. No.: 15/369,563

(22) Filed: Dec. 5, 2016

Related U.S. Application Data

(63) Continuation of application No. 14/568,241, filed on Dec. 12, 2014, now Pat. No. 9,539,900, which is a
(Continued)

(51) Int. Cl.
*B60W 30/00* (2006.01)
*B60W 30/18* (2012.01)
(Continued)

(52) U.S. Cl.
CPC ...... *B60W 30/18172* (2013.01); *B60W 10/06* (2013.01); *B60W 10/184* (2013.01);
(Continued)

(58) Field of Classification Search
CPC ............ B60K 28/16; B60W 2510/104; B60W 2520/263; B60W 2710/1038;
(Continued)

(56) References Cited

U.S. PATENT DOCUMENTS

| 4,036,536 A | 7/1977 | Quon |
| 4,484,280 A | 11/1984 | Brugger et al. |

(Continued)

FOREIGN PATENT DOCUMENTS

| EP | 0717690 | 3/1999 |
| EP | 0794080 | 9/2002 |

(Continued)

OTHER PUBLICATIONS

"The FIA prepares to nip traction control in the bud," On Track, 2000, 20(7):4-5.

*Primary Examiner* — Jason Holloway
(74) *Attorney, Agent, or Firm* — Fish & Richardson P.C.

(57) ABSTRACT

In general, the subject matter described in this specification can be embodied in methods, systems, and program products for performing vehicle traction control. Time intervals between points of rotation of a rotating vehicle output shaft are measured. Indicators of shaft rotation rate are generated using, for each generated indicator, a set of one or more of the time intervals. The generated indicators of shaft rotation rate are used to determine a value indicative of a rate of change of shaft rotation rate. An indicator of a maximum allowable output shaft rotation rate is computed. A current indicator of output shaft rotation rate is determined to exceed the maximum allowable output shaft rotation rate. In response to determining that the current indicator exceeds the maximum allowable output shaft rotation rate, a signal to trigger application of a traction control mechanism is output.

20 Claims, 6 Drawing Sheets

Related U.S. Application Data continuation of application No. 14/047,334, filed on Oct. 7, 2013, now Pat. No. 8,930,113, which is a continuation of application No. 12/721,392, filed on Mar. 10, 2010, now Pat. No. 8,554,440.

(60) Provisional application No. 61/292,467, filed on Jan. 5, 2010.

(51) Int. Cl.
 *B60W 10/184* (2012.01)
 *B60W 10/06* (2006.01)

(52) U.S. Cl.
 CPC ..... *B60W 2520/28* (2013.01); *B60W 2530/14* (2013.01); *B60W 2710/06* (2013.01); *B60W 2710/18* (2013.01)

(58) Field of Classification Search
 CPC . B60W 2710/1055; B60W 2710/1061; B60W 30/18172; B60W 10/06; B60W 10/184; B60W 2710/18; B60W 2710/06; B60W 2530/14; B60W 2520/28; F16H 59/40; F16D 2500/30421; F16D 2500/30428; F16C 41/007; F16C 41/008
 See application file for complete search history.

(56) References Cited

U.S. PATENT DOCUMENTS

| | | | |
|---|---|---|---|
| 4,615,410 A | 10/1986 | Hosaka | |
| 4,763,912 A | 8/1988 | Matsuda | |
| 4,856,610 A | 8/1989 | Leiber et al. | |
| 4,873,639 A | 10/1989 | Sato et al. | |
| 5,033,574 A * | 7/1991 | Kushi | B60K 28/16 180/197 |
| 5,179,526 A | 1/1993 | Zimmer et al. | |
| 5,181,175 A | 1/1993 | Shiraishi et al. | |
| 5,255,193 A | 10/1993 | Katayose et al. | |
| 5,269,391 A | 12/1993 | Ito et al. | |
| 5,275,253 A | 1/1994 | Sperduti et al. | |
| 5,293,315 A | 3/1994 | Kolbe et al. | |
| 5,351,779 A | 10/1994 | Yamashita | |
| 5,379,634 A | 1/1995 | Kuroda et al. | |
| 5,388,895 A | 2/1995 | Negrin | |
| 5,404,304 A | 4/1995 | Wise et al. | |
| 5,405,301 A | 4/1995 | Yagi et al. | |
| 5,459,662 A | 10/1995 | Tezuka et al. | |
| 5,463,551 A | 10/1995 | Milunas | |
| 5,517,414 A | 5/1996 | Hrovat | |
| 5,519,617 A | 5/1996 | Hughes et al. | |
| 5,548,513 A | 8/1996 | Masuda et al. | |
| 5,704,444 A * | 1/1998 | Showalter | B60K 23/0808 180/197 |
| 5,735,362 A | 4/1998 | Hrovat et al. | |
| 5,797,108 A | 8/1998 | Otsubo et al. | |
| 6,070,680 A * | 6/2000 | Oyama | B60K 6/48 180/65.25 |
| 6,165,103 A | 12/2000 | Tenzor et al. | |
| 6,449,552 B2 | 9/2002 | Ohba et al. | |
| 6,577,944 B1 * | 6/2003 | Davis | B60K 28/16 180/197 |
| 6,615,126 B1 | 9/2003 | Potter et al. | |
| 6,631,779 B2 * | 10/2003 | Watson | B60K 17/342 180/248 |
| 6,782,961 B1 * | 8/2004 | Ishikawa | B60K 28/16 180/197 |
| 6,810,318 B2 | 10/2004 | Brooks et al. | |
| 7,341,541 B2 | 3/2008 | Houtman et al. | |
| 7,632,202 B2 | 12/2009 | Supina et al. | |
| 7,641,014 B2 | 1/2010 | Hu | |
| 8,285,465 B2 | 10/2012 | Wu et al. | |
| 8,554,421 B2 * | 10/2013 | Sheriff | B60W 50/082 307/10.1 |
| 2001/0025219 A1 * | 9/2001 | Ohba | B60K 6/365 701/89 |
| 2004/0020700 A1 * | 2/2004 | Watson | B60K 17/342 180/247 |
| 2004/0054459 A1 | 3/2004 | Brooks et al. | |
| 2007/0163376 A1 * | 7/2007 | Baldet | B60K 37/06 74/473.31 |
| 2007/0193802 A1 | 8/2007 | Hu | |
| 2009/0312918 A1 * | 12/2009 | Aubert Sola-Morales | B60K 20/02 701/48 |
| 2010/0280696 A1 * | 11/2010 | Yoshida | B60L 3/10 701/22 |
| 2011/0054727 A1 * | 3/2011 | Ebuchi | B60W 20/10 701/22 |

FOREIGN PATENT DOCUMENTS

| | | |
|---|---|---|
| JP | S60-107429 | 6/1985 |
| JP | 8-232697 | 9/1996 |

* cited by examiner

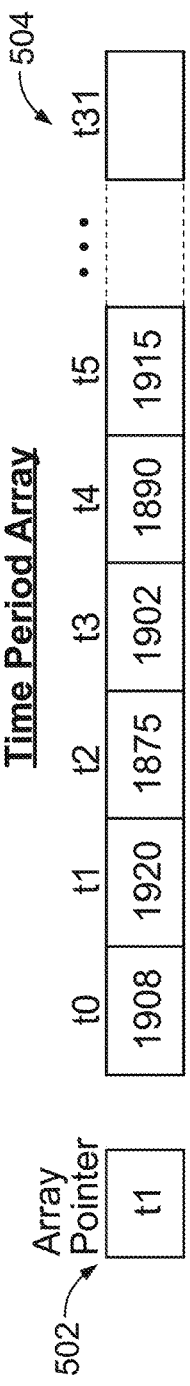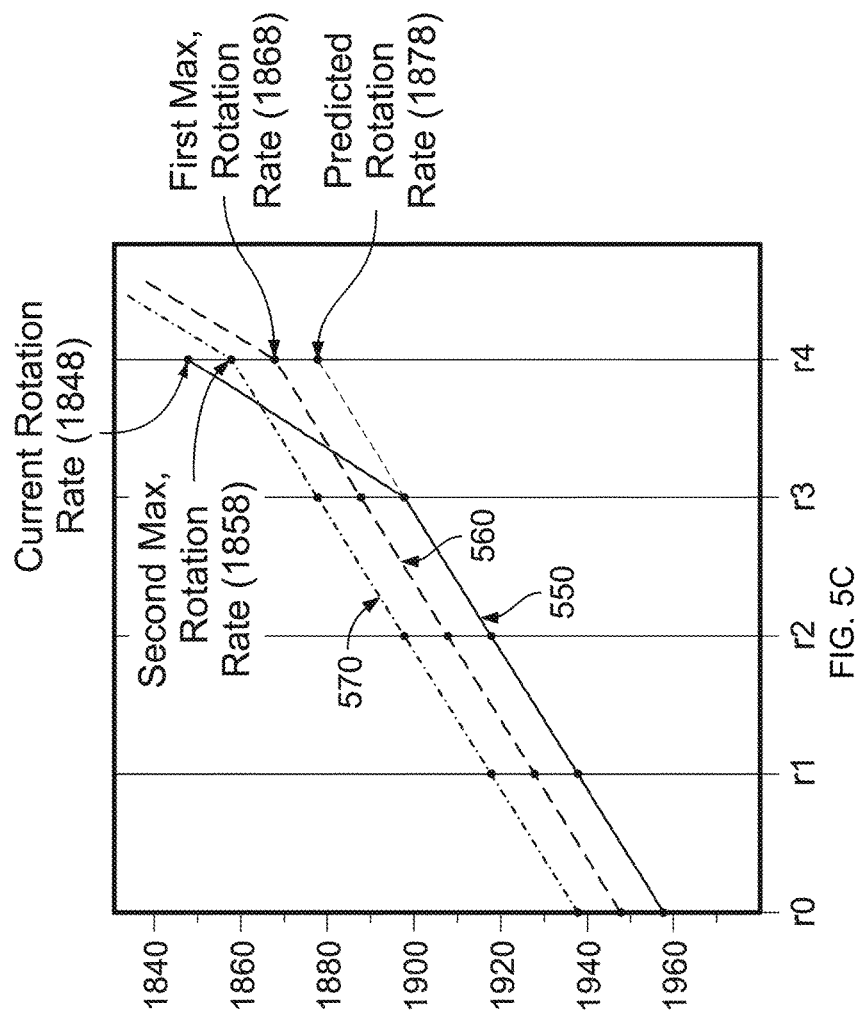

ELECTRONIC TRACTION CONTROL

RELATED APPLICATIONS

This application is a continuation application and claims priority to U.S. patent application Ser. No. 14/568,241 filed Dec. 12, 2014, which is a continuation of U.S. patent application Ser. No. 14/047,334 filed Oct. 7, 2013, which is a continuation of U.S. patent application Ser. No. 12/721,392 filed Mar. 10, 2010, which claims the benefit under 35 U.S.C. § 119 of U.S. Provisional Application No. 61/292,467, titled "Electronic Traction Control," filed Jan. 5, 2010, which is incorporated by reference herein in its entirety.

TECHNICAL FIELD

This document generally describes techniques, methods, systems, and mechanisms for performing vehicle traction control.

BACKGROUND

The present disclosure generally relates to vehicle traction control. An ability to propel a vehicle safely and reliably occurs when a vehicle's wheel contacts a surface so that the wheel, when rotated, moves the vehicle forward. However, a drive force, known as torque, may be great enough to overcome a frictional grip of the wheel on the surface. If the frictional grip is overcome, the wheel may slip in relation to the surface so that the wheel rotates at a higher surface rate than a surface rate or velocity of the vehicle. Once the frictional grip (static friction) between the wheel and the surface is overcome by excess torque, sliding friction (kinetic friction) occurs. Kinetic friction may be less than static friction, providing an increased likelihood of wheel slippage. If the drive force that was sufficient to overcome the frictional grip (static friction) continues to be applied to the wheel, and the rotation rate of the wheel is restrained only by the sliding friction (kinetic friction), the wheel may continue to rotate, potentially increasing in speed.

The wheel slippage situation described above may occur frequently during an operation of an automobile. The slippage can occur if an excessive drive force is applied to the wheels or if adequate wheel-to-road friction changes to inadequate wheel-to-road friction (e.g., due to inclement weather). Once a slippage condition begins, the driver has less control of the speed or a direction of travel of the automobile. Automobile drivers may attempt to control this slippage by reducing a speed at which the driving wheels are rotating, either by reducing the engine power through fuel control or by applying the car's brakes. Of course, the driver must first recognize that slippage is occurring, decide upon the proper correction, and make the correction. This mental processing and reaction takes time. When driving, however, the amount of time for a driver to evaluate and act on a situation is limited.

SUMMARY

This document describes techniques, methods, systems, and mechanisms for performing vehicle traction control. As an example implementation, an electronic sensor may monitor a rotation of a vehicle engine output shaft. The monitoring can include repeatedly measuring a time interval between one marker on the shaft rotating past a fixed sensor and a second marker on the shaft rotating past the fixed sensor. The first and second markers may be among a plurality of markers that are equally spaced around the shaft or equally spaced apart from each other.

Among the repeated measurements, the highest and lowest measured time intervals for a single rotation of the shaft may be removed. The highest and lowest time intervals may be removed because while the markers may be equally spaced, they may have been placed on a split collar so that a gap between two of the markers may be inconsistent with the gaps between the other markers (e.g., leading to a higher or lower time interval). The remaining time intervals for a single rotation may be averaged to negate discrepancies in a placement of the markers on the split collar. The resulting rotation rate indicator (sometimes referred to hereinafter as solely the rotation rate) can be stored in an array of rotation rates for different time periods.

A calculation can be performed to determine if a most recent indicator of rotation rate exceeds a maximum allowable rotation rate. If the current rotation rate exceeds the maximum allowable rate, traction control may be invoked. If the current rotation rate does not exceed the maximum allowable rotation rate, traction control may not be invoked.

The maximum allowable rotation rate may be determined by calculating a rate of change between historically determined rotation rates. As an example, a difference between two previously determined rotation rates can be calculated. The difference in each rotation rate (e.g., 20 microseconds) can represent a previous acceleration of the vehicle. Stated differently, each rotation rate can represent an averaged time of rotation between markers. A decrease in the averaged time of rotation can represent an increase in acceleration between each computation of time of rotation.

A calculation may determine a predicted current rate of shaft rotation using the previous rotation rate and the representation of previous acceleration. A threshold value can be added to the predicted current rate of rotation to generate the maximum allowable rotation rate. The addition of the threshold value can allow for acceptable increases in acceleration (e.g., an amount of shaft acceleration that is reasonable given a vehicle's weight and traction with the road). The threshold value can be adjusted by a user (e.g., through a user accessible dial or input buttons) to allow the user to dial-up a minimal amount of desired wheel slippage with the road or dial-down full traction with the road. In some implementations, the traction control mechanism changes the threshold based on a gear of the vehicle, without user input.

As understood by a skilled artisan, rotation of a vehicle shaft can be represented with multiple equivalent terminologies that may not all lend themselves to clearly consistent terminology. For example, in implementations where the rotation rate is indicated by a time period of rotation, a rotation rate may exceed a maximum allowable rate if a time period of rotation is less than an allowable time period. Thus, the use of language in this document, such as maximum allowable rotation rate or increasing rotation rate, can reference a minimum acceptable rotation time period or a decreasing time period of rotation.

In general, one aspect of the subject matter described in this specification can be embodied in a computer-implemented method for performing vehicle traction control. Time intervals between points of rotation of a rotating vehicle output shaft are measured. Indicators of shaft rotation rate are generated using, for each generated indicator, a set of one or more of the time intervals. Each generated indicator identifies a rate of shaft rotation for a different time. The generated indicators of shaft rotation rate are used to determine a value indicative of a rate of change of shaft rotation rate. An indicator of a maximum allowable output shaft rotation rate is computed based on the value indicating the determined rate of change and a previous indicator of output shaft rotation rate. A current indicator of output shaft rotation rate is determined to exceed the maximum allowable output shaft rotation rate. The current indicator is for a time that is subsequent to a time for the previous indicator. In response to determining that the current indicator exceeds the maximum allowable output shaft rotation rate, a signal to trigger application of a traction control mechanism is output.

Another aspect of the subject matter described in this specification can be embodied in a computer program product, tangibly stored on a computer-readable storage medium, for performing vehicle traction control. The product includes computer program instructions operable to cause a processor to perform operations. The operations can include measuring time intervals between points of rotation of a rotating vehicle output shaft. Indicators of shaft rotation rate are generated using, for each generated indicator, a set of one or more of the time intervals. Each generated indicator identifies a rate of shaft rotation for a different time. The generated indicators of shaft rotation rate are used to determine a value indicative of a rate of change of shaft rotation rate. An indicator of a maximum allowable output shaft rotation rate is computed based on the value indicating the determined rate of change and a previous indicator of output shaft rotation rate. A current indicator of output shaft rotation rate is determined to exceed the maximum allowable output shaft rotation rate. The current indicator is for a time that is subsequent to a time for the previous indicator. In response to determining that the current indicator exceeds the maximum allowable output shaft rotation rate, a signal to trigger application of a traction control mechanism is output.

In yet another aspect, the subject matter described in this specification can be embodied in a system for performing vehicle traction control. The system includes a means to determine time intervals between each rotation of multiple points of rotation of an output shaft of a vehicle power unit past a position sensor. The system includes a rate determination unit to generate indicators of shaft rotation rate using, for each generated indicator, a set of one or more of the identified time intervals. Each generated indicator identifies a representation of a rate of shaft rotation over a different time interval. The system includes an acceleration determination unit to determine values indicative of acceleration of the shaft. The values are determined using two or more of the generated indicators of shaft rotation rate. The system includes a maximum rate determination unit to compute indicators of maximum allowable shaft rotation rate based on previous indicators of shaft rotation rate and values indicative of acceleration of the shaft. The system includes a comparator to determine that a current indicator of output shaft rotation rate exceeds a maximum allowable shaft rotation rate that was computed for a same time interval as the current indicator, and to output, in response to the determination that the current indicator exceeds the maximum allowable shaft rotation rate, a signal to trigger application of a traction control mechanism.

These and other implementations can optionally include one or more of the following features. The vehicle output shaft can be a drive shaft. The vehicle output shaft can be an output shaft of a transmission unit. Measuring time intervals between points of rotation can include measuring a time interval between (i) receiving an indication that a first discrete point on the shaft has rotated past a fixed reference point, and (ii) receiving an indication that a second discrete point on the shaft has rotated past the fixed reference point. Generating indicators of shaft rotation rate can include averaging multiple time intervals in the set. The set of time intervals can be multiple time intervals that correspond to a rotation of the vehicle output shaft. Generating indicators of shaft rotation rate includes can include removing from the set of time intervals, prior to the averaging, the highest and lowest time intervals in the set. Computing the indicator of the maximum allowable output shaft rotation rate can include adding to the previous indicator of shaft rotation rate the value indicative of the rate of change and a threshold value of an acceptable increase in rate of change. Computing the indicator of the maximum allowable output shaft rotation rate can include computing a predicted output shaft rotation rate based on the determined rate of change and a previous indicator of output shaft rotation rate, and adding to the predicted output shaft rotation a threshold value that is modifiable by a user of a vehicle that is implementing the method for performing vehicle traction control. Operations can iteratively (i) measure the time intervals between the points of rotation, (ii) generate the indicators of shaft rotation rate, (iii) determine values indicative of rate of change of shaft rotation rate, (iv) compute an indicator of a maximum allowable output shaft rotation rate, (v) determine that a current indicator of output shaft rotation rate exceeds the maximum allowable output shaft rotation rate, and (vi) output a signal to trigger application of a traction control mechanism. The points of rotation of the vehicle output shaft may be substantially equally spaced about a circumference of the vehicle output shaft. A regenerative brake can be applied as an energy recovery mechanism as the application of the traction control mechanism. The signal to trigger application of the traction control mechanism may not be output if the current indicator is not determined to exceed the maximum allowable output shaft rotation rate.

The vehicle output shaft can be a drive shaft. The points or rotation can be located on a split collar that is affixed to the output shaft. The set of time intervals can include time intervals representative of one or more full rotations of the output shaft. Generating the indicators can include removing from the set of time intervals the highest, lowest, or highest and lowest time intervals in the set and averaging the remaining time intervals. Computing the indicators of maximum allowable shaft rotation rate can include adding to a previous indicator of shaft rotation rate a value indicative of an acceleration of the shaft and a threshold value of an acceptable increase in acceleration. The points of rotation of the vehicle output shaft can be substantially equally spaced about a circumference a collar that is affixed to the vehicle output shaft. The position sensor can be affixed to the rotating output shaft and the points of rotation can be fixed to a structure that surrounds the output shaft but does not rotate with the output shaft.

Particular embodiments can be implemented, in certain instances, to realize one or more of the following advantages. The measurement of timing between markers on the rotating shaft can allow for a greater resolution in determining rotation velocity and acceleration. Such greater resolution can increase an ability to identify unwelcome acceleration or increase rate of identification of the acceleration. In contrast, measuring a quantity of markers that pass a fixed location during a specific time interval or determining which of several markers has most recently passed the fixed location may not be as accurate. Measuring a quantity of markers during a fixed time interval may provides a low integer (e.g., 9 or 10 markers) while a time measurement may provide a number with a higher resolution e.g., 1910 microseconds). For example, a measurement of 9 "markers" may not indicate whether or not the shaft is at an effective position of 9.1 or 9.9 markers.

Additionally, discrepancies in physical positions of the markers may be compensated by averaging the time intervals that correspond to one or more full rotations of the output shaft. If markers for less than full rotations are averaged, machining abnormalities may be detected in some measurements, but not others. Further, removing the highest and/or the lowest time intervals can remove timing discrepancies that are associated with markers that are placed on a split collar. "Learning" the historical rate of change of shaft rotation (i.e., the acceleration) allows the traction control mechanism to operate without accessing complex tables that account for multiple signals other than a speed of the vehicle, engine, or wheel. A system that learns the historical rate of acceleration can be produced more cost effectively and applied to multiple vehicles. A user can adjust a level of permitted output shaft acceleration.

The details of one or more embodiments are set forth in the accompanying drawings and the description below. Other features, objects, and advantages will be apparent from the description and drawings, and from the claims.

DESCRIPTION OF DRAWINGS

FIG. 5A is an array of time periods, as determined by the traction control mechanism.

FIG. 5B is an array of rotation rates, as determined by the traction control mechanism.

FIG. 5C is graph illustrating a current rotation rate and two different maximum allowable rotation rates.

Like reference symbols in the various drawings indicate like elements.

DETAILED DESCRIPTION

This document generally describes technologies for performing vehicle traction control.

Figure 1:
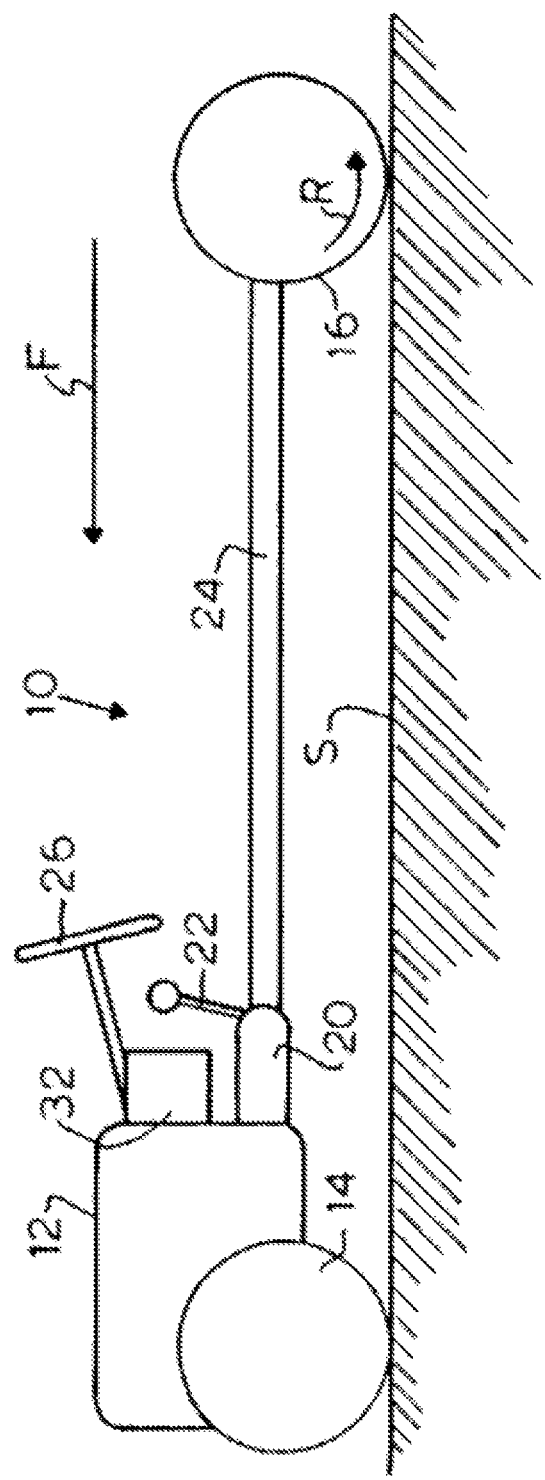
FIG. 1 illustrates a drive system of an automobile that is driving on a road surface.

FIG. 1 illustrates a drive system of an automobile 10 that is driving on a road surface S. Automobile 10 includes an engine 12, front wheels 14, and driving wheels 16. The term "engine" is used to designate any power unit, e.g., an internal combustion engine or an electric motor. Engine 12 is connected to drive wheels 16 by transmission 20 and drive shaft 24. An engine management system 32 (also referred to herein as an engine control module) includes a microprocessor adapted to receive signals indicating the rate and condition of engine 12 and to generate signals responsive thereto for adjusting various engine operating parameters accordingly. Transmission 20 is controlled by gear shift lever 22, and may portray a manual transmission, automatic transmission, or continuously variable transmission. Directional control of automobile 10 is achieved through steering wheel 26. As engine 12 transmits power through transmission 20 and drive shaft 24 to drive wheels 16, drive wheels 16 are rotated in the direction indicated by arrow R and automobile 10 travels in the direction indicated by arrow F. The vehicle illustrated in FIG. 1 is depicted as a "rear wheel" drive system. It is recognized that the benefits of the present invention are also obtained when applied to an automobile using a front wheel drive system or an all wheel drive system.

To move automobile 10 forward from a stopped condition, or to increase the speed of the automobile, the torque transmitted from the engine 12 to the drive wheels 16 is increased, increasing the power applied at the interface between drive wheels 16 and road surface S. As long as the traction, determined by the weight on drive wheels 16 times the static coefficient of friction of the wheels against road surface S, is greater than the torque delivered to the driving wheels, the automobile will travel forward. Static friction prevails when two surfaces in contact maintain the same rate of motion (e.g., when the surface speed of the rotating wheel equals the forward travel of the vehicle). However, if the traction is reduced because of a lowering in coefficient of friction, or if the torque increases to a value greater than the static friction, the drive wheels 16 may begin to slip on road surface S and kinetic friction (which has a lower value than static friction) prevails. Kinetic friction occurs when the two surfaces in contact have different rates of motion.

Automobile 10 accelerates under conditions of ordinary power application without slippage. As automobile 10 moves faster, engine 12 rotates faster, assuming there is no change in gear ratio. Since the torque to drive wheels 16 is necessarily higher in first gear than in the other gears, if a loss of traction is possible, it will often occur when the transmission is in first gear. Therefore, for purposes of traction control, it is often necessary to account for the engine rate changes that occur in first gear.

The degree of acceleration of an automobile of known weight and power may not exceed a maximum value, which can be calculated and used in a determination of a threshold value of acceptable acceleration (described below in this document). However, under conditions of wheel slippage, automobile 10 may not move forward faster, but engine 12 may rotate faster (potentially with a greater rotational acceleration than a respective maximum rate of automobile acceleration). Although an automobile will accelerate faster going downhill than uphill, the difference between acceleration under the downhill and uphill conditions may be small compared to engine rate changes when traction is lost. Since the friction between road surface S and drive wheel 16 is lower under conditions of slip (kinetic friction) than when wheel 16 rotates at the same surface speed as a forward velocity of the vehicle (static friction), once wheels 16 begin to slip, the wheels 16 may continue accelerating. Engine 12 and drive shaft 24 may accelerate at rates proportionally the same as that of wheels 16. Thus, indications of excessive engine rate change or drive shaft rate change may relate directly to conditions of wheel slippage.

Once a determination of wheel slippage has been made, for example, if an engine or drive shaft rate of change exceeds an acceptable threshold and as described in more detail in this document, a correction must be made. Correction to overcome slippage and restore traction can be accomplished by a number of methods, including, but not limited to, reduction of fuel fed to engine 12, varying spark ignition timing, applying wheel braking, reducing boost in a turbocharged system, reducing an application of nitrous, reducing current to an electric motor that drives the wheels, or performing electromagnetic braking and energy recovery in a hybrid vehicle (e.g., by applying a regenerative brake as an energy recovery mechanism). The present document is equally adapted to any correction method used, including, but not limited to, those noted herein.

One aspect of the present document focuses on a method of determining slippage and applying a differential correction depending on a degree of engine acceleration in excess of a pre-selected threshold. In some implementations, the slippage threshold is established on the basis of the automobile weight, engine power, tire size and type, vehicle gear, suspension type, and road conditions. The traction described in this document may relate to acceleration, not braking or decelerating. Aspects of the technologies described in this document may be discussed in U.S. Pat. No. 6,577,944, which is incorporated by reference herein in its entirety.

Figure 2:
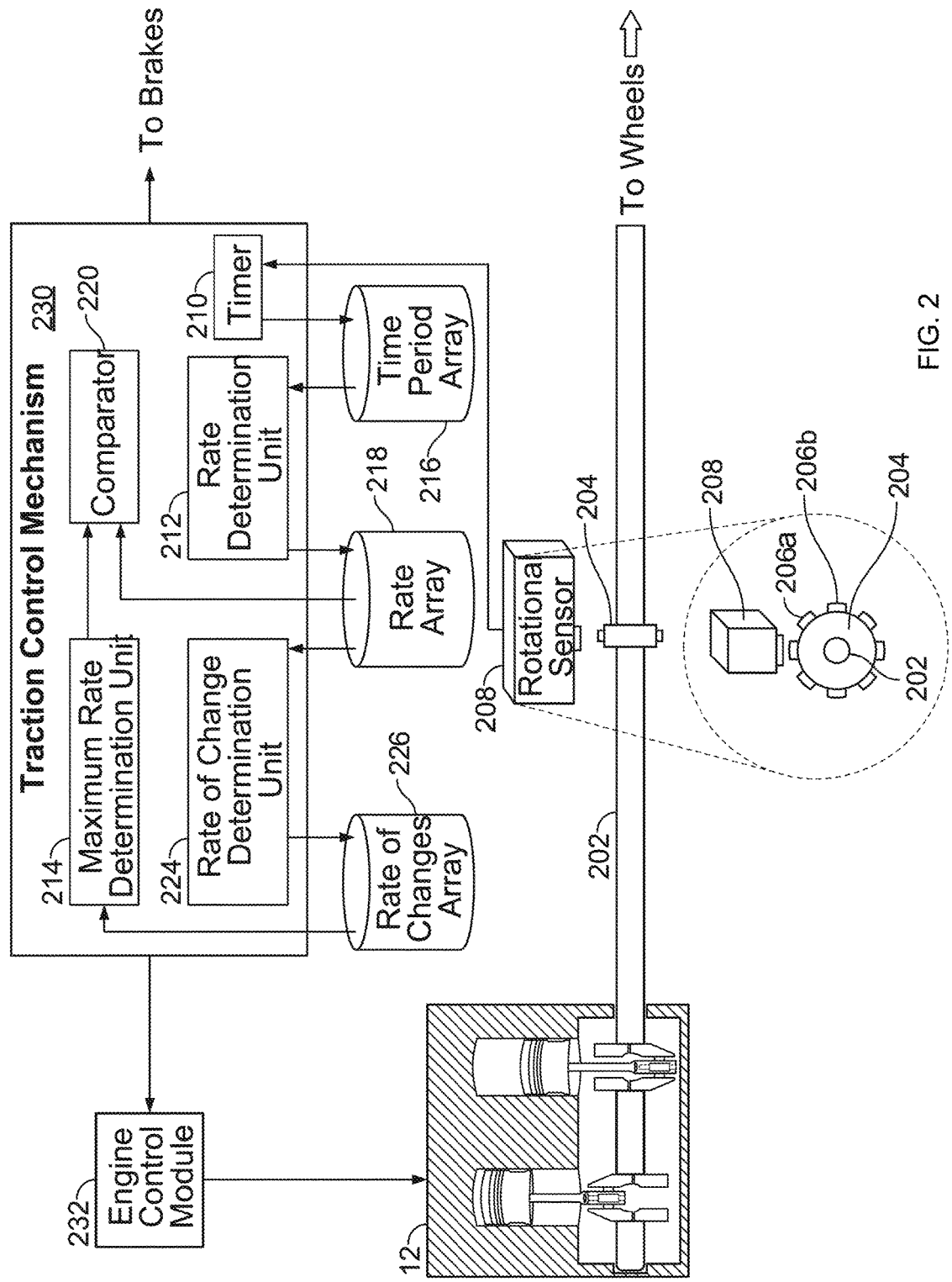
FIG. 2 is an schematic representation of a vehicle traction control system.

FIG. 2 is a schematic representation of a vehicle traction control system. As engine 12 rotates a shaft 202, a rotational sensor 208 measures time periods between points of rotation 206a,b that are attached to collar 204. A timer 210 measures the time periods between the points of rotation 206a,b and saves the time periods in a circular array 216 (e.g., array 504). The rate determination unit 212 periodically accesses the array 216 to generate an indicator of recent shaft rotation rate (e.g., by averaging several recent time period values that have been stored in the array). The indicator of shaft rotation rate is saved in a rate array 218 (e.g., array 520). Each saved indicator of shaft rotation rate can identify a rate of shaft rotation for a different times (e.g., every 20 ms). Using the saved indicators of shaft rotation rate, the rate of change determination unit 224 can determine a rate of change between the shaft rotation rates (i.e., an acceleration). For example, a most recent shaft rotation rate may be compared to a second most recent shaft rotation rate to determine a rate of change between the two. The rate of change may be a difference in time, a difference in velocities, or a calculated acceleration. The rate of change can be stored in the rate of changes array 226 and used to determine if a subsequently calculated rotation rate exceeds an allowable increase in acceleration.

A maximum rate determination unit 214 may determine a rate at which a current shaft rotation rate may trigger a traction control response. For example, the maximum rate determination unit 214 may use the last indicator of shaft rotation rate and a previously determined rate of change to identify a value at which the shaft should currently be rotating if acceleration is constant (i.e., a predicted rotation rate). A buffer corresponding to an allowable acceleration since the last indicator may be added to the predicted rotation rate to determine the maximum rate of shaft rotation. If the buffer of allowable acceleration is an allowable decrease in rotational rate time periods, the buffer may be subtracted from a previous rotational rate time period. The buffer allows for a minimal increase in acceleration or tire slippage to not invoke a traction control response.

The comparator 220 determines if a current indicator of shaft rotation rate (e.g., drawn from the rate array 218) exceeds the maximum rate of shaft rotation. If the shaft is rotating faster than the maximum rate, a signal that requests a traction control response may be transmitted to other electrical or mechanical systems that perform the traction control. If the shaft is not rotating faster than the maximum rate, a signal may not be transmitted to invoke the traction control response.

In some implementations, the signal is transmitted to an engine control module 232. Upon receiving the signal, the engine control module may modify engine timing ignition, reduce a flow of fuel for combustion to the engine, or reduce boost to a non-naturally aspirated engine (e.g., with a supercharger or blower). In some implementations, the signal may be provided to a mechanism that applies brakes to one or more of the vehicle's wheels. In some implementations, transmitting the signal causes a hybrid vehicle to perform regenerative braking or causes a vehicle with a nitrous oxide system to reduce the introduction of the nitrous oxide.

The shaft 202 may be the engine crankshaft, the engine camshaft, a shaft placed on the front of the engine, a shaft between the engine and the transmission, a rotating portion of the transmission, a driveshaft between the transmission and a differential, any other shaft leaving a torque multiplying or reducing unit, the axel, or the wheels. The shaft 202 may be any auxiliary shaft that is driven by the engine, for example, an alternator shaft or a water pump shaft. In some examples, the output shaft is any shaft that is driven by the engine and rotated at a ratio of the engine crankshaft speed. In some implementations, the points of rotation 206a,b are mechanically contacted by a brush of the rotational sensor 208. The mechanical contact may trigger an interrupt in a microcontroller that performs operations to store a period of time that has elapsed since the last interrupt triggered by the rotational sensor 208. In some implementations, the points of rotation 206a,b and the rotational sensor 208 do not physically contact but operate with magnetic sensing or image detection techniques to measure time periods of rotation of shaft 202.

In some implementations, the points of rotation 206a,b are substantially equally spaced around a surface of the collar 204. For example, an equidistant positioning of each of the points of rotation 206a,b may vary by less than 2%, 1%, 0.5%, 0.3%, or 0.1%. In some implementations, the collar 204 that is attached to the shaft 202 is a split-collar, so that the collar may manufactured separately from the shaft 202 and affixed thereto. In a split-collar, two of the points of rotation 206a,b may be farther spaced farther apart or closer apart, depending on the gap created by the split and the fit of the collar on the shaft 202. Thus, a time period of rotation between the points 206a,b that straddle the split may be substantially larger or smaller than a time period or rotation between other of the points of rotation. The straddling points of rotation may have been substantially equidistant before splitting the collar. In some implementations, the rotational sensor 208 is mounted to the shaft 202 or collar 204 and measures rotational movement past a plurality of positions of rotation 206a,b that are mounted circumferentially about the shaft 202 or collar 204 in fixed positions (e.g., a hoop that surrounds the shaft 202).

Figure 3:
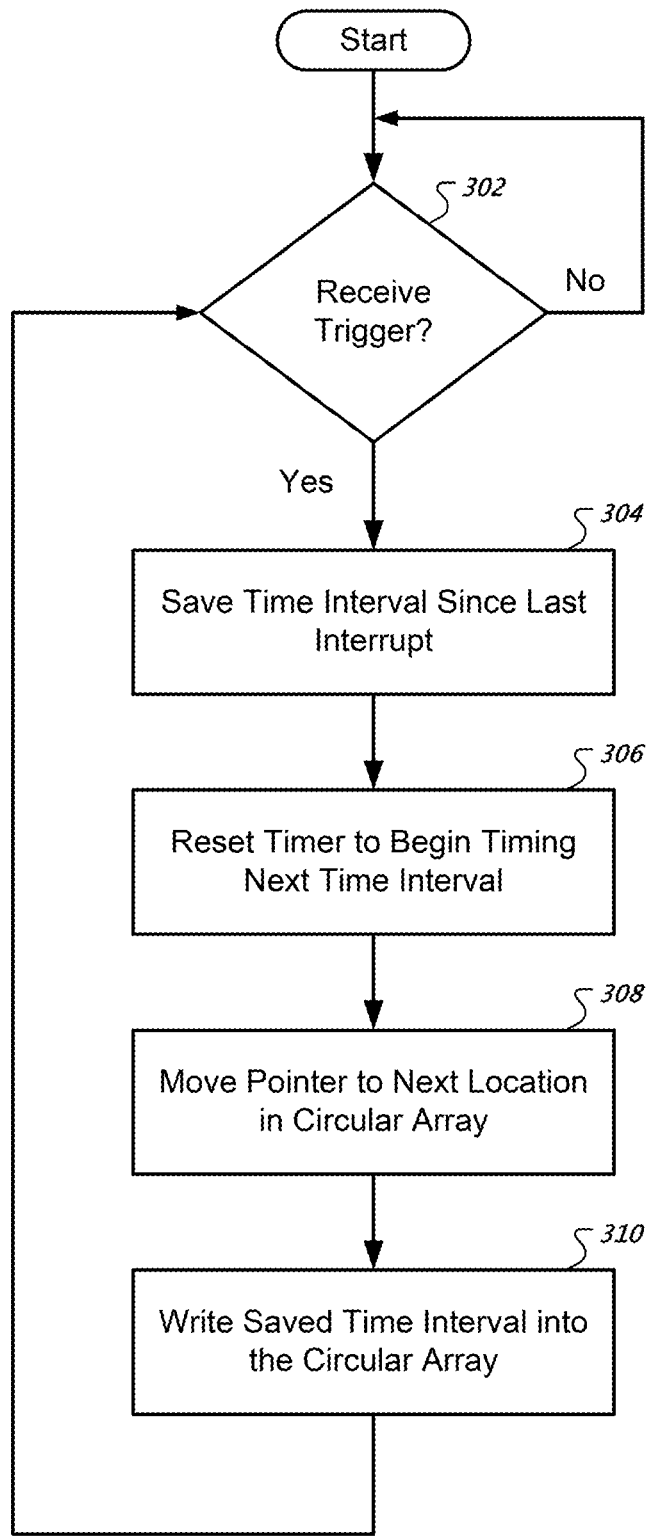
FIG. 3 is a flow chart of an example process for measuring and saving time periods.

FIG. 3 is a flow chart of an example process 300 for measuring and saving time periods. The operations of process 300 can be implemented using the rotational sensor 208 in cooperation with the points of rotation 206a,b, the timer 210, and the time period array 216, 504.

In box 302, a determination if a trigger is received is performed. For example, the determination may include receiving an interrupt in a microcontroller or computer processor as a point of rotation 206a,b passes by or contacts the rotational sensor 208. In some implementations, a dedicated software routine polls a status of a computer processor port that is associated with the rotational sensor 208. For example, if the port reads "1" a point of rotation 206a,b may not be passing by the rotational sensor 208, but if the port reads "0" one of the points of rotation 206a,b may be passing by the rotational sensor. The determination in box 302 may be repeatedly performed until a trigger is received.

In box 304, a trigger has been received and a time interval since a previous interrupt is saved as a value in a time period array 216, 504. For example, the time interface can include a number of instruction cycles or a value in seconds or portions of a second. As an illustration, suppose that a trigger is received and the timer 210 identifies that 1920 microseconds have passed since the last interrupt. The array pointer 502 currently points to the location t1 in the array. Thus, the value "1920" may be stored in array location t1. In some implementations, the array includes 32 total locations (e.g., positions 0 to 31).

In box 306, the timer 210 is reset. For example, the timer may be reset to "0" so that a next time period may be counted. In some implementations, the timer is not reset but the value of the timer when the trigger is received is stored so that a subsequent trigger can determine an intervening time period. In some instances, a time period is referred to as a sample.

In box 308, the pointer is moved to the next location in the time period array 504. The time period array 504 may be a circular array (e.g., a ring buffer). The array pointer may regularly update to hold the array location of the most recent time period. Because the array is a circular array, decrementing the array pointer may jump the pointer backwards to the previous sample. If the array pointer is decremented from zero, it may be reset to 31. If incremented past 31, it may reset to zero.

In box 310, the saved time interval is written into the array. In some implementations, the operations of box 304 are not performed and a time interval is directly written into the array without saving the timer interval. A skilled artisan will understand that variations to the general principles of process 300 may be implemented. For example, the pointer may point to the "next" or "last" locations in the array, instead of a current location. The array may store a number of clock cycles, a converted time, a distance of rotation, etc. In some implementations, a regular buffer is used (not a ring buffer). The use of a circular array may allow only a limited number of recent time periods to be stored in the ring buffer. The time periods in the ring buffer may continuously be overwritten so that only very recent information rotational values may be stored. The process described with respect to FIG. 4 can describe a process for taking snapshots of shaft rotation speed and storing these snapshots over a longer period of time.

Figure 4:
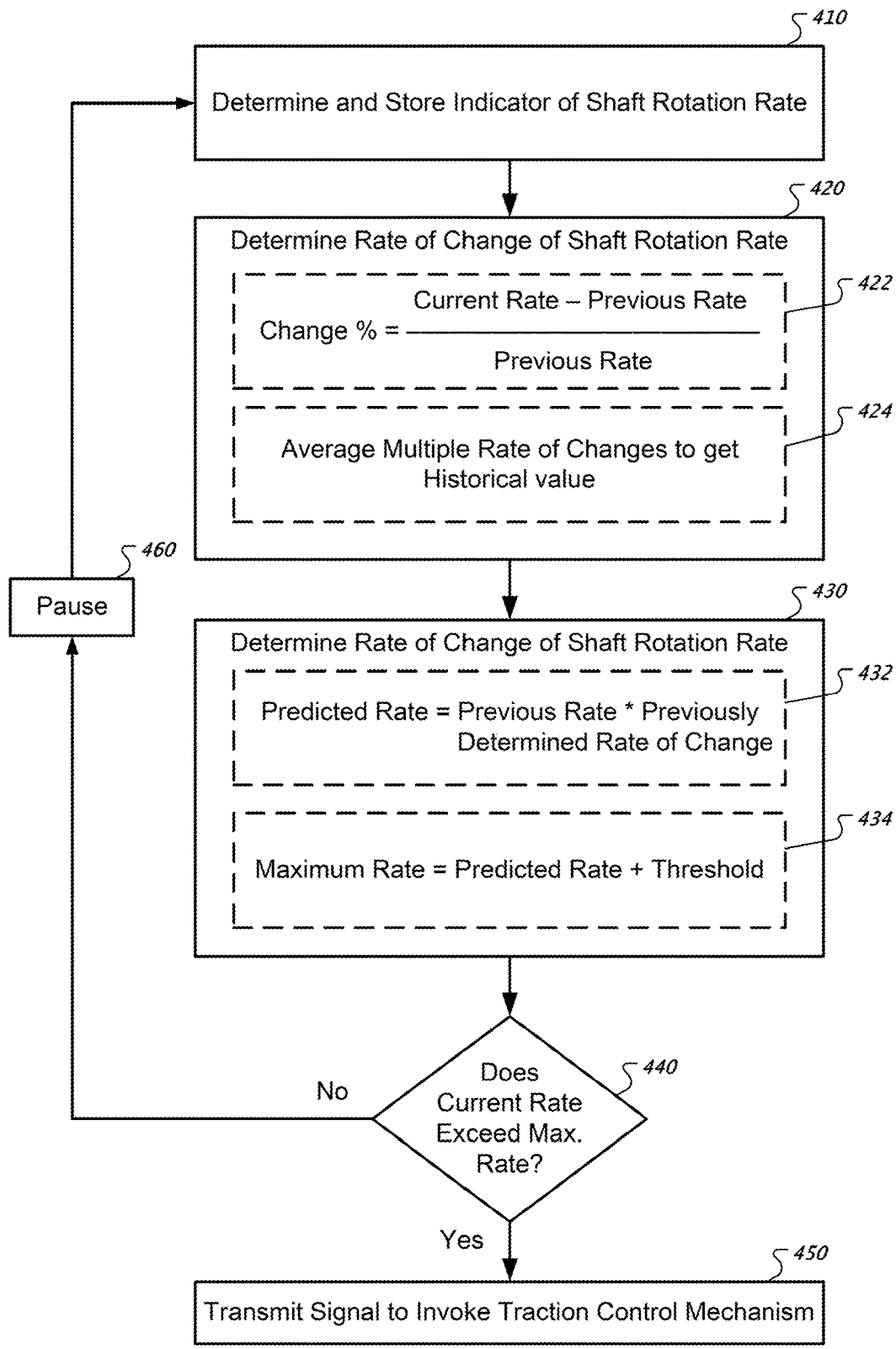
FIG. 4 is a flowchart of an example process for performing vehicle traction control.

FIG. 4 is a flowchart of an example process 400 for performing vehicle traction control. The operations of process 400 may be performed using the systems, illustrations, and methods described in relation to FIGS. 1-3 and 5-6.

In box 410, an indicator of shaft rotation rate is determined and is stored. As an illustration, the rate determination unit 212 may read multiple time intervals that are stored in the time period array 216, 504 (e.g., as determined by process 300) and perform a mathematical computation using the time intervals. For example, the time periods or a subset thereof may be averaged or a mean value may be obtained. Minor defects in machining and placement of the points of rotation 206a,b may be identifiable because of the high resolution obtained when measuring time between the points of rotation. As an illustration, suppose the shaft 202 was rotating at a perfectly constant velocity. Because the position indicators may not be exactly evenly spaced about a circumference of the collar 204, the times in array 504 are illustrated as varying from 1875 microseconds to 1920 microseconds. Thus, averaging multiple time periods enables a generation of an indicator that is representative of a rate of shaft rotation but less prone to physical errors in machining (e.g., than if a single time period between markers was selected as representative of shaft rotational rate). The rate determination unit 212 may read the most recent values in the time period array 216, 504 (e.g., the values behind the array pointer 502).

In some implementations, a quantity of time periods equal to one rotation of the shaft 202 (or a multiple thereof) are averaged or used in the calculation. For example, eight recent time periods in array 504 may be averaged because the collar 204 includes eight points of rotation 206a,b. Averaging a multiple of the quantity of points of rotation on the shaft 202 may ensure that an averaged number does not fail to account for a machined error (e.g., a time period that corresponds to a larger or smaller physical gap that exists between two of the points of rotation), or count a time period that is associated with the machined error more than other time periods are counted.

In some implementations, the collar 204 is a split collar. The position indicators 206a,b may have been machined so as to be substantially evenly spaced around a circumference of the collar 204, but the collar may have been split for placement on the shaft 202. One or more of the time periods associated with a full rotation of the shaft 202 may be erroneous and longer or shorter than the other time periods as a result of splitting of the collar. Thus, the highest and lowest time periods may be removed from an averaging of time periods to ensure that the erroneous time period is not counted. In some implementations, only the highest time period is removed or only the lowest time period is removed. In some implementations multiples of the highest or lowest time periods are removed (e.g., the two highest or two lowest) when time periods associated with multiple rotations of the shaft 202 are used in a mathematical calculation of the shaft rotation indicator.

In some implementations, a single point of rotation on the shaft is monitored to determine a time of shaft rotation. Measurement of a single point of rotation, however, may not provide the traction control mechanisms described in this document with the most recent acceleration information. For example, if a point of rotation 206 has performed almost a full rotation, but has not quite reached the sensor 208, the traction control mechanism may not be aware of any acceleration that has occurred during the present rotation of the shaft. In these implementations, the method may measure time intervals between the single point of rotation of a vehicle output shaft and generate indicators of shaft rotation rate using, for each generated indicator, a set of the single time interval. Thus, both of arrays 504 and 520 may be unnecessary.

In box 420, a rate of change of shaft rotation rate is determined. Thus, the system can determine how a recent acceleration of the tires (or at least the shaft 202). An exemplary method for performing the determination includes taking a current indicator of shaft rotation rate (e.g., the most recent indicator stored in array 520 at time r4), subtracting a previous indicator of shaft rotation rate (e.g., an indicator at time $r_3$), and divide the difference by the previous indicator. This exemplary method is illustrated in box 422. The determined rate of change can be stored in rate of changes array 226 for use in a subsequent iteration of process 400. In some implementations, the rate of change is determined for use in a current iteration of process 400. In these implementations, the previous rate of change (not the current rate of change) may be taken, and from it subtracted yet an earlier rate of change, and divided by the earlier rate of change (e.g., (time $r_3$–time $r_2$)/time $r_2$). Other mechanisms for determining a rate of change using the array 520 or 504 are readily discernable by those skilled in the art.

In some implementations, the rate of change is stored in an array of rate changes 226. The array may include multiple stored rate change associated with different time intervals. Each stored rate of change may be determined and added during different iterations of process 400, or multiple stored rate of changes may be determined and added during a single iteration of process 400. In some implementations, multiple rate of changes are averaged to get a historical value (optional box 424). The historical value may be less susceptible to error or a sudden recent change in acceleration.

In box 430, a maximum allowable shaft rotation rate is calculated. The maximum rate may be used to determine if a current shaft rotation rate is too fast and is associated with an excessive acceleration (e.g., a slippage of the wheels). The maximum allowable shaft rotation rate can be calculated by determining a predicted shaft rotation rate for a current time. The predicted shaft rotation rate can be determined using one or more determined rate of changes in a calculation with a previous shaft rotation rate. An exemplary operation for determining the predicted shaft rotation rate is illustrated in box 432. The predicted shaft rotation rate may be determined as a product of the previous rate and a determined rate of change. As an illustration, the shaft rotation rates stored in array 420 have been decreasing in rate by 20 microseconds during each iteration of process 500 (a steady rate of change between each shaft rotation rate). Thus, if a predicted rate of change were calculated for time r4, the predicted rate of change may be 1878.

In some implementations, the maximum rotation rate is calculated by adding a threshold value to the predicted shaft rotation rate (box 434). Without a threshold value, an increase in acceleration may exceed the "maximum rate" and invoke a traction control operation. The threshold value may be a number that allows for increases acceleration that the particular vehicle is capable, but not increases in shaft rotation rate that are not associated with forward vehicle acceleration. In examples where the maximum rotation rate is an indicator of shaft rotation time, the threshold value (if a positive number) may be subtracted from the predicted shaft indicator of shaft rotation time. Thus, the maximum rotation rate may be an indicator of shaft rotation time that is less than an indicator of predicted shaft rotation time. Adding a threshold value to the predicted shaft rotation rate can include subtracting the threshold value when the shaft rotation rate is identified as a time or rotation.

The threshold value may be modified by a user input (e.g., a dial on a dashboard of the vehicle). Thus, a user of the vehicle may be able dial in how aggressive he would like the traction control. If the user would like little slippage (e.g., if the user is drag racing), he can set the dial to a low threshold so that traction control mechanisms are invoked with a minimal amount of excessive acceleration. If the user would like a fair amount of slippage (e.g., if the user would like a little slide when taking corners), he can set the dial to a high threshold. At the high threshold, the traction control may only be invoked if a substantial amount of shaft acceleration is measured (e.g., if the user loses control of his vehicle and the wheels break free from a surface of the ground). In some implementations, the user-defined threshold is added to a pre-determined threshold. The pre-determined threshold may be threshold that is fixed or non-modifiable by a user when seated in the vehicle.

In some implementations, multiple different maximum rotation rates are determined. Each maximum rotation rate may be the predicted shaft rotation rate with a different threshold added to the predicted rotation rate. Thus, different traction control operations can be invoked depending on a current rotation rate of the shaft. For example, varying levels of fuel or varying modifications to ignition timing may be implemented. In some implementations, a continuum of traction control operations are invoked for a range of rotation rates that exceed a maximum rotation rate. For example, the difference between a current rotation rate that exceeds the maximum rotation rate, and the maximum rotation rate, may be used in a calculation to determine a degree of traction control operations to invoke.

In the illustration of FIGS. 5A-5C, the predicted rotation rate at time r4 is 1878 microseconds (e.g., by subtracting the rate of change of 20 microseconds from—or adding a rate of change of 20 microseconds to—the previous rotation rate of 1898 microseconds). The time at t5 may be referred to herein as the "current" rotation rate because it is the most recent. A threshold of 10 microseconds may be subtracted from the predicted rotation rate to generate the first maximum rotation rate of 1868 (see FIG. 5C). A threshold of 10 microseconds may be added to this value to generate the second maximum rotation rate 1858 (see FIG. 5C).

In box 440, a determination is made whether the current shaft rotation rate exceeds the maximum allowable shaft rotation rate. For example, the shaft rotation rate of 1848 microseconds that is stored in array 520 at location r4 may be considered the "current" rotation rate. Because 1848 microseconds is a faster rotational rate than both the first maximum rate of 1868 microseconds and the second maximum rate of 1858 microseconds, the current rotation rate exceeds the maximum allowable shaft rotation rates (even though the number is, in effect, smaller). Thus, a signal that triggers a traction control mechanism is transmitted (box 450) and a traction control mechanism is invoked.

In box 460, a software pause is implemented. Implementing a software pause can allow the rate of change time to change between iterations of process 400. Thus, a current rotational rate of a shaft may, during a time of the pause, be able to increase to a rate that exceeds the maximum rotational value. Empirical testing and observation has determined that times between 9 milliseconds and 45.562 milliseconds may serve as proper time periods of pause.

In various implementations, the position sensor measures a degree or distance of rotation of a positional indicator 206a,b. In some implementations, the vehicle includes an accelerometer and the process 500 is calculated using an acceleration determined by the accelerometer. For example, a most recent rate of change of the rotating shaft may be compared to a rate of change of the accelerometer. If the rate of change of the rotating shaft exceeds the rate of change of the accelerometer by a threshold amount, the system may determine that the wheels are spinning faster than the vehicle is moving forward.

FIG. 5A is an array of time periods, as determined by the traction control mechanism 230, and as represented by the time period array 216. The time period array is discussed above.

FIG. 5B is an array of rotation rates, as determined by the traction control mechanism 230, and as represented by the rate array 218. The array of rotation rates is discussed above.

FIG. 5C is graph illustrating a current rotation rate and two different maximum allowable rotation rates. The upward trending line 550 represents an acceleration of the rotating shaft, and the numbers on the Y-axis represent decreasing indicators of rotational times as the shaft increases in rotational rate. In this graph, the lowest line 550 illustrates a rate of rotation of shaft 202. The illustrated rotation rate of the shaft includes the values from array 520. The two highest lines 560 and 570 represent the rotation rates that may trigger traction control mechanisms (i.e., the lines represent the maximum allowable rotation rates). As illustrated to the right side of the graph, maximum allowable rotation rates may be determined for a time period in advance of a current rotation rate (e.g., by determining a rate of change in rotation rate and multiplying the most recent rotation rate by the determined rate of change).

In this illustration, the rotation rate continues at a constant acceleration of 20 microseconds per calculated rotation rate through time $r_3$. Because the acceleration is constant, the rotation rate does not exceed either of the maximum allowable rotation rates for a given point in time. However, at time $r_4$ the calculated rotation rate increases dramatically, representing a sudden increase in acceleration of the vehicle shaft 202. The rotation rate at time $r_4$ (1848 microseconds) exceeds both maximum rotation rates (1868 microseconds and 1858 microseconds) and thus a signal corresponding to a maximum traction control action is transmitted. If the current rotation rate had been 1862 microseconds (i.e., between the maximum both maximum rotation rates), a signal corresponding to a minimum traction control action may be transmitted.

In some implementations, upon invoking a traction control action, a previously determined rate of change and previously determined rotational rate may be used in calculations of future maximum rotational rates. In other words, if a slippage condition is identified at time $r_4$, the maximum rotational rate lines 560 and 570 may not be calculated so as to follow the upward trend of the current rotation rate (as they are illustrated in FIG. 5C). Instead, the maximum rotational rate lines 560 and 570 may trend forward with a same upward progression of 20 microseconds per time period as illustrated between times $r_0$ and $r_4$. Thus, a traction control mechanism may continue to be invoked for time periods $r_5+$ until the rotational rate settles below the maximum rotational rate lines 560 and 570 that are trending upward without regard for acceleration at or after identification of a slippage condition. In some examples, once a slippage condition is encountered, the maximum rotational rates remain fixed (e.g., they remain at or substantially near 1868 and 1858 microseconds) and a traction controller operation is invoked until the current rotation rate falls beneath the fixed maximum rotational rate.

In some implementations, the described technologies are implemented in a vehicle that is driven by one or more electric motors. The electric motors may be more responsive to energy input than a liquid fuel fed engine, and thus a speed of the motors may be determined without measuring a physical rotation of an output shaft. For example, a speed of the motor or a rotational speed of the wheels may be determined based on the frequency of electric energy applied to the motor to power the motor (e.g., because the electric motor may rotate at a rate that is substantially proportional to the applied frequency. The speed may also be determined based on an electronic signal that identifies a desired speed of rotation (e.g., an electronic input from an accelerator to a computerized speed determination unit, or an output of a desired speed of engine rotation that is from the computerized speed determination unit).

Figure 6:
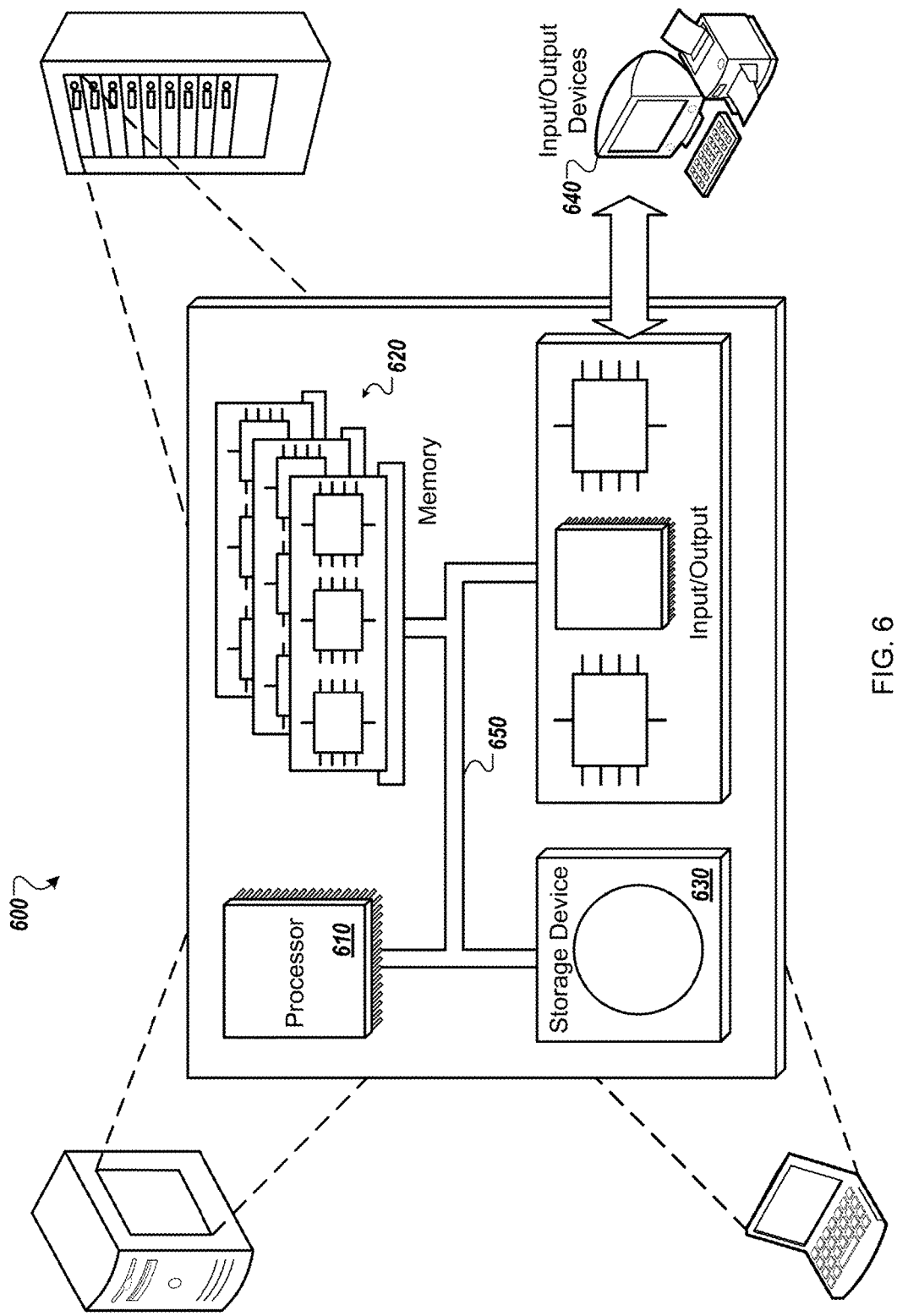
FIG. 6 is a block diagram of computing devices that may be used to implement the systems and methods described in this document, as either a client or as a server or plurality of servers.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method to affect rotation of a rotating vehicle shaft, comprising:
    calculating, by a computing system, a time that it took for the rotating vehicle shaft to rotate from a first position to a second position, wherein calculating the time that it took for the rotating vehicle shaft to rotate from the first position to the second position includes measuring a time interval between a sensor identifying passage of the first position and the sensor identifying passage of the second position;
    determining, by the computing system and using the calculated time, an indication of an actual rotation rate of the rotating vehicle shaft;
    identifying, by the computing system, an indication of an excessive rotation rate of the rotating vehicle shaft for comparison to the indication of the actual rotation rate of the rotating vehicle shaft;
    determining, by the computing system and based on the indication of the actual rotation rate of the rotating vehicle shaft and the indication of the excessive rotation rate of the rotating vehicle shaft, whether the actual rotation rate of the rotating vehicle shaft exceeds the excessive rotation rate of the rotating vehicle shaft; and
    outputting, by the computing system and in response to the computing system having determined that the actual rotation rate of the rotating vehicle shaft exceeds the excessive rotation rate of the rotating vehicle shaft, a signal to trigger application of a mechanism that limits rotation of the rotating vehicle shaft.

2. The computer-implemented method of claim 1, wherein the rotating vehicle shaft includes a vehicle drive shaft or an output shaft of a vehicle transmission unit.

3. The computer-implemented method of claim 1, wherein the mechanism that limits rotation of the rotating vehicle shaft includes a traction control mechanism.

4. The computer-implemented method of claim 1, wherein the mechanism limits rotation of the rotating vehicle shaft by modifying engine ignition timing, reducing a flow of fuel for engine combustion, reducing boost, applying brakes to one or more vehicle wheels, or performing regenerative braking.

5. The computer-implemented method of claim 1, wherein the computing system is configured to not output the signal to trigger application of the mechanism that limits rotation of the rotating vehicle shaft in response to the computing system having determined that the actual rotation rate of the rotating vehicle shaft did not exceed the excessive rotation rate of the rotating vehicle shaft.

6. The computer-implemented method of claim 1, wherein:
    the sensor is fixed to a portion of a vehicle that is different from the rotating vehicle shaft; and
    measuring the time interval includes measuring a time interval between when a first point on the rotating vehicle shaft passes the sensor and when a second point on the rotating vehicle shaft passes the sensor.

7. The computer-implemented method of claim 1, wherein:
    the sensor is fixed to the rotating vehicle shaft; and
    measuring the time interval includes measuring a time interval between when the sensor passes a first point on a vehicle to when the sensor passes a second point on the vehicle.

8. The computer-implemented method of claim 1, further comprising calculating, by the computing system, another time that it took for the rotating vehicle shaft to rotate from a third position to a fourth position,
    wherein determining the indication of the actual rotation rate of the rotating vehicle shaft includes applying a mathematical process to the calculated time and the calculated another time to generate the indication of the actual rotation rate of the rotating vehicle shaft.

9. The computer-implemented method of claim 1, wherein identifying the indication of the excessive rotation rate of the rotating vehicle shaft includes identifying, by the computing system, a predicted rotation rate of the rotating vehicle shaft that represents an increase by a threshold amount over a historical change in rotation rate of the rotating vehicle shaft.

10. The computer-implemented method of claim 1, wherein identifying the indication of the excessive rotation rate of the rotating vehicle shaft includes:
    determining, by the computing system, a historical change in rotation rate of the rotating vehicle shaft that is based on at least two rotation rates of the rotating vehicle shaft, wherein each of the at least two rotation rates of the rotating vehicle shaft used a calculated time that it took for the rotating vehicle shaft to rotate between different positions to determine the respective rotation rate of the rotating vehicle shaft; and
    generating the indication of the excessive rotation rate of the rotating vehicle shaft includes using (i) the indication of the actual rotation rate of the rotating vehicle shaft, (ii) the determined historical change in rotation rate of the rotating vehicle shaft, and (iii) a threshold amount of acceptable change in the rotation rate of the rotating vehicle shaft.

11. A non-transitory computer-readable storage medium that includes instructions to affect rotation of a rotating vehicle shaft, the instructions, when executed by a processor, cause the processor to perform operations that comprise:
calculating, by a computing system, a time that it took for the rotating vehicle shaft to rotate from a first position to a second position, wherein calculating the time that it took for the rotating vehicle shaft to rotate from the first position to the second position includes measuring a time interval between a sensor identifying passage of the first position and the sensor identifying passage of the second position;
determining, by the computing system and using the calculated time, an indication of an actual rotation rate of the rotating vehicle shaft;
identifying, by the computing system, an indication of an excessive rotation rate of the rotating vehicle shaft for comparison to the indication of the actual rotation rate of the rotating vehicle shaft;
determining, by the computing system and based on the indication of the actual rotation rate of the rotating vehicle shaft and the indication of the excessive rotation rate of the rotating vehicle shaft, whether the actual rotation rate of the rotating vehicle shaft exceeds the excessive rotation rate of the rotating vehicle shaft; and
outputting, by the computing system and in response to the computing system having determined that the actual rotation rate of the rotating vehicle shaft exceeds the excessive rotation rate of the rotating vehicle shaft, a signal to trigger application of a mechanism that limits rotation of the rotating vehicle shaft.

12. The non-transitory computer-readable storage medium of claim 11, wherein the rotating vehicle shaft includes a vehicle drive shaft or an output shaft of a vehicle transmission unit.

13. The non-transitory computer-readable storage medium of claim 11, wherein the mechanism that limits rotation of the rotating vehicle shaft includes a traction control mechanism.

14. The non-transitory computer-readable storage medium of claim 11, wherein the mechanism limits rotation of the rotating vehicle shaft by modifying engine ignition timing, reducing a flow of fuel for engine combustion, reducing boost, applying brakes to one or more vehicle wheels, or performing regenerative braking.

15. The non-transitory computer-readable storage medium of claim 11, wherein the computing system is configured to not output the signal to trigger application of the mechanism that limits rotation of the rotating vehicle shaft in response to the computing system having determined that the actual rotation rate of the rotating vehicle shaft did not exceed the excessive rotation rate of the rotating vehicle shaft.

16. The non-transitory computer-readable storage medium of claim 11, wherein:
the sensor is fixed to a portion of a vehicle that is different from the rotating vehicle shaft; and
measuring the time interval includes measuring a time interval between when a first point on the rotating vehicle shaft passes the sensor and when a second point on the rotating vehicle shaft passes the sensor.

17. The non-transitory computer-readable storage medium of claim 11, wherein:
the sensor is fixed to the rotating vehicle shaft; and
measuring the time interval includes measuring a time interval between when the sensor passes a first point on a vehicle to when the sensor passes a second point on the vehicle.

18. The non-transitory computer-readable storage medium of claim 11, wherein the operations further comprise calculating, by the computing system, another time that it took for the rotating vehicle shaft to rotate from a third position to a fourth position,
wherein determining the indication of the actual rotation rate of the rotating vehicle shaft includes applying a mathematical process to the calculated time and the calculated another time to generate the indication of the actual rotation rate of the rotating vehicle shaft.

19. The non-transitory computer-readable storage medium of claim 11, wherein identifying the indication of the excessive rotation rate of the rotating vehicle shaft includes identifying, by the computing system, a predicted rotation rate of the rotating vehicle shaft that represents an increase by a threshold amount over a historical change in rotation rate of the rotating vehicle shaft.

20. The non-transitory computer-readable storage medium of claim 11, wherein identifying the indication of the excessive rotation rate of the rotating vehicle shaft includes:
determining, by the computing system, a historical change in rotation rate of the rotating vehicle shaft that is based on at least two rotation rates of the rotating vehicle shaft, wherein each of the at least two rotation rates of the rotating vehicle shaft used a calculated time that it took for the rotating vehicle shaft to rotate between different positions to determine the respective rotation rate of the rotating vehicle shaft; and
generating the indication of the excessive rotation rate of the rotating vehicle shaft includes using (i) the indication of the actual rotation rate of the rotating vehicle shaft, (ii) the determined historical change in rotation rate of the rotating vehicle shaft, and (iii) a threshold amount of acceptable change in the rotation rate of the rotating vehicle shaft.

* * * * *